J. D. KING.
SAFETY ATTACHMENT FOR RAILWAY CARS.
APPLICATION FILED JULY 1, 1919.
1,344,231. Patented June 22, 1920.
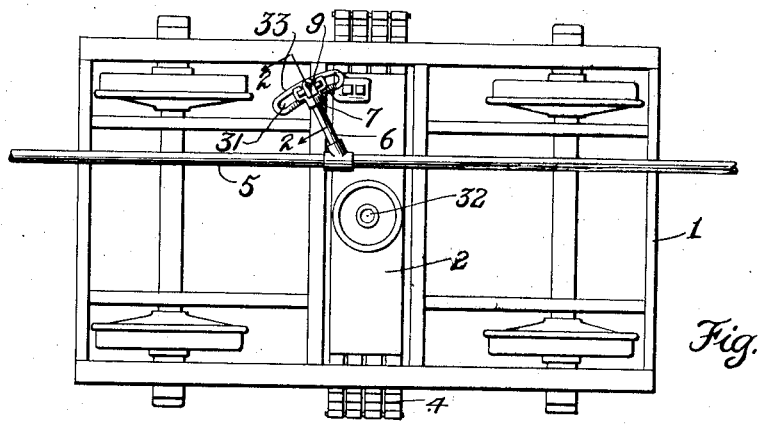
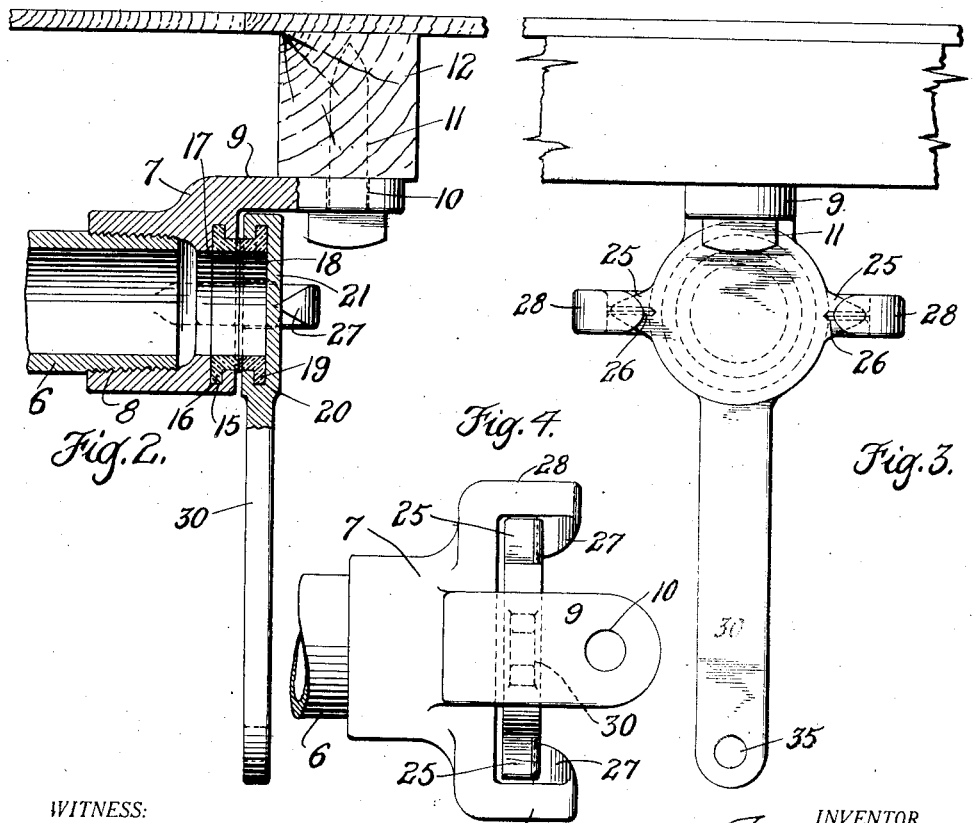
WITNESS:
Gustav Genzlinger
INVENTOR.
James D. King
BY
Cyrus N. Anderson
ATTORNEY.

UNITED STATES PATENT OFFICE.

JAMES D. KING, OF MERIDIAN, MISSISSIPPI.

SAFETY ATTACHMENT FOR RAILWAY-CARS.

1,344,231.  Specification of Letters Patent.  Patented June 22, 1920.

Application filed July 1, 1919. Serial No. 307,953.

*To all whom it may concern:*

Be it known that I, JAMES D. KING, a citizen of the United States, and a resident of Meridian, in the county of Lauderdale and State of Mississippi, have invented an Improvement in Safety Attachments for Railway-Cars, of which the following is a specification.

My invention relates to attachments for railway cars which are adapted to effect automatic operation of the air brake system to cause application of the brakes in case a truck or trucks should happen to move an abnormal distance laterally with relation to the car body and the air line of the brake system carried by said body, as in the case of derailment of a truck.

One object of my invention is to provide a construction such as to insure that when there is an abnormal lateral movement of the truck relatively to the car body, the valve of the attachment which controls the action of the air brake system shall, without fail, be operated to thereby effect operation of the system and consequent application of the brakes.

A further object of my invention is to provide a construction in which the valve has means rigidly connected therewith which means is adapted to be actuated by contact with a member having connection and moving with the truck bolster or some other part of the truck frame structure of a railway car, in case there should be abnormal relative lateral movement between the truck frame structure and the body of the car to thereby effect opening of said valve.

A still further object of my invention is to simplify and cheapen the construction and at the same time increase its efficiency and certainty of operation.

Other objects and advantages of my invention will be pointed out in the detailed description thereof which follows or will be apparent from such description.

In order that my invention may be more readily understood and its practical advantages fully appreciated, reference may be had to the accompanying drawing in which I have illustrated one convenient form of embodiment of the same. It will be understood, however, that my invention is susceptible of embodiment in other forms of construction than that shown and that changes in the details of construction and arrangement may be made within the scope of the claims without departing from the invention.

In the drawing:

Figure 1 is a top plan view of a railway truck and showing a portion of an air line pipe of an air brake system and also showing in top plan view an attachment embodying my invention;

Fig. 2 is a vertical, sectional view through a portion of the bottom of a car body and of an undersill, and of a portion of the attachment taken on line 2—2 of Fig. 1;

Fig. 3 is a side elevation of the same; and

Fig. 4 is a top plan view of the attachment, separated from the car structure.

Referring to the drawing: 1 designates as a whole the truck frame of a car structure and 2 the truck bolster. The latter supports the body of the car, the bolster and body structure being pivotally connected by means of a king pin (not shown) in known manner.

5 designates the air line pipe of the air brake system from which extend laterally and horizontally bleed pipes 6 (only one of which is shown in the drawing). Each of these bleed pipes is provided with a terminal or head member 7 at its outer end, such terminal or head member having screw threaded connection with the outer end of the bleed pipe, as indicated at 8 in Fig. 2.

Each head or terminal is provided with a projection 9 having an opening 10 therethrough, through which extends a screw 11 which secures the head or terminal to a sill 12 or any other part of the car body structure.

The outer end of each of the heads or terminals is provided with an undercut groove 15 in which is seated the annular flange 16 of a gasket 17. This gasket coöperates with a gasket 18, the annular flange 19 of which is seated in an annular groove 20 formed in a valve member 21. The gaskets 17 and 18 are of any suitable yielding material, such, for instance, as rubber. The valve member or body 21 is provided with diametrically opposed projections or lugs 25 each of which is provided with a notch 26 which notches are adapted to be engaged by the edges of inwardly extending wedge shaped projections 27 formed upon the inner sides of projections 28 at diametrically oppositely disposed points upon the head.

The relatively sharp edges of the projections 27 face or are in opposing relation to the outer side of the head or terminal 7 and are spaced therefrom a sufficient distance to permit the forcing of the projections 25 under the said edges, so as to cause the latter to engage with the notches 26. To facilitate the engagement of the edges of the projections 27 with the notches 26, the outer sides of the projections 25 upon opposite sides of the notches are inclined or beveled as shown, so that the edges of the projections 27 will readily slide thereover. The inclined surfaces operate in a sense as cams.

As the valve member 21 is placed in position with the opposing edges of the gaskets 17 and 18 in contact with each other and is then twisted so as to cause engagement of the edges of the projections 27 with the notches 26, the gaskets are compressed and their tendency to force the valve member outwardly holds the said notches 26 in permanent engagement with the knife like edges of the projections 27 until a considerable force, sufficient to effect rotation of the valve member 21 to disengage the notches from the projections 27, is applied to the said valve.

In order to effect rotation of the valve member 21, to cause opening of the said valve and the bleeding of the air line pipe through the bleed pipe 6 to effect application of the brakes in case of the derailment of a truck or other accident causing undue or abnormal relative lateral movement of the truck with respect to the body of the car, I have provided the valve 21 with a projecting arm 30 which arm preferably is integral with the valve but may otherwise be connected thereto. The lower depending end of said arm is adapted to extend into a slot 31 which is concentric with the king pin or with the hole 32 therefor in the truck bolster, which slot is formed in a bracket 33 preferably, though not necessarily, secured to the said body bolster. As it generally happens that the unduly great or abnormal lateral movement of the truck with respect to the body of the car is about the king pin as a pivot, I have provided that the axes of the head or terminal 7 and of the valve member 21 (which are co-incident) shall extend at right angles to lines which are tangential to the curved slot 31, in order that when the bracket 33 has been moved through a sufficient distance to cause one end or the other of the slot 31 to contact with the arm 30, the force applied to such arm, as a result of such contact, will tend to rotate the same about the axis of the valve, thus reducing to a minimum the possibility of any binding action between the valve and the head. The length of the slot 31 is such that the relative oscillations and movements between the arm 30 and the bracket 33 in which the said slot is located due to the normal operation and movements of the car, are not of sufficient extent to cause the ends of said slot to contact with the said arm.

In order to prevent loss of the valve in case of derailment or other accident causing the opening thereof and the disengagement of the projections 25 thereon from the projections 27, I have provided the lower end of the arm 30 with a hole 35 to which one end of a chain or cord (not shown) may be attached, the other end being attached to some part of the truck frame structure.

It will be observed that in the construction embodying my invention the head or terminal member 7 upon the outer end of the bleed pipe 6 is secured by means of the screw 11 to the part 12 of the under frame structure of the car body, in consequence of which there is no likelihood that when pressure is applied to the handle 30 to rotate the valve 21 to disengage the projections 25 from the projections 27 the valve 21 and head 7 will rotate together and thereby prevent opening of the valve and thus prevent operation of the device and the consequent application of the brakes as intended.

Normally the valve 21 is in closed position as shown in the drawing and it remains in that position until it is removed by some one for some purpose, or until it is disengaged from its seat, as the result of a derailment of a truck. Upon the latter event, and as already stated, the truck moves laterally relatively to the body of the car, and generally about the king pin as a pivot. Such movement causes one end or the other of the slot 31 in the bracket 33 carried upon the truck bolster 2, to contact with the arm 30 to turn the latter in one direction or the other, which causes turning of the valve 21 and effects disengagement of the projections 25 upon said valve from the projections 27 integral with the head or terminal 7. The valve being released, the compressed air escapes through a bleed pipe 6 from the air line pipe as a result of which the brakes are applied.

I claim:

1. In a safety attachment for railway cars, the combination of the air line pipe of an air brake system, a bleed pipe extending laterally from said air line pipe, said bleed pipe having projections extending forwardly from the end thereof, which projections terminate in inward extensions and the said projections being situated in opposed relation with respect to each other, a valve member having projections upon its edge which projections are situated in opposed relation with respect to each other, the said valve member being situated intermediate the end of said bleed pipe and the inward extensions of the projections from said pipe to close the latter, and the said valve member being provided with an arm, and means supported upon the truck structure of a railway car which is adapted to engage the said arm upon abnormal lateral movement of said truck structure to cause movement thereof to disengage the projections upon the said valve member from the said extensions, thereby permitting displacement of said valve member from over the end of said bleed pipe.

2. In a safety attachment for railway cars, the combination of the air line pipe of an air brake system, a bleed pipe leading therefrom terminating in a head portion provided with means for supporting a gasket, a relatively movable valve member also provided with means for supporting a gasket, the said gasket, and the said valve member being provided with a depending arm rigidly connected therewith, the truck bolster, a bracket projecting from said truck bolster and having a curved slot therein concentric with the center of said bolster into which the said arm projects, the length of said slot being such that its opposite ends will not contact with the said arm except when there is abnormal relative movement between the said bracket and bolster and the said arm.

3. In a safety attachment for railway cars, the combination of the air line pipe of an air brake system, said pipe having a bleed pipe projecting laterally therefrom, a detachable head member secured to the outer end of said bleed pipe, said head member being provided with a gasket which is secured thereon, means for securing the said head member to a part of the body structure of the car, a valve member also provided with a gasket which is adapted to contact with the first named gasket and the said valve member being provided with a projection having rigid connection therewith, a bracket supported upon the truck frame structure of the car, said bracket being provided with a curved slot concentric with the king pin of the car structure, said slot being of such length that it will not contact with the said arm except when there is abnormal relative lateral movement between the same and the truck frame structure.

4. In a safety attachment for railway cars, the combination of the air line pipe of an air brake system, a bleed pipe leading therefrom, a detachable head member secured to the outer end of said bleed pipe, said head member being provided with a projecting lug, means for connecting said lug to a part of the car body structure, a valve member for closing the outer end of said bleed pipe, said valve member being provided with a depending arm having rigid connection therewith and the said valve member also having notched projections extending in the plane thereof and the said head member having projections which are adapted to engage the said notches to hold the said valve member in closed position, a truck frame structure, and a bracket secured to a part thereof and having a curved slot therein concentric with the king pin for connecting the body and truck bolsters, said slot being of such length that it will contact with the arm to effect movement thereof only when there is abnormal lateral movement between the said truck frame structure and the car body structure.

5. In a safety attachment for railway cars, the combination of the air line pipe of an air brake system having a bleed pipe extending therefrom, said bleed pipe having a head or terminal at its outer end, said head or terminal having an opening therethrough in continuation of the opening in the bleed pipe, a valve member for closing the said opening, an arm having connection with said valve member, a truck structure, and a bracket supported upon said structure, said bracket having a curved slot therein into which the said arm extends, the said arm being concentric with respect to the axis about which the car frame structure pivots with respect to the car body structure and being of a length such that the said arm does not contact with the opposite end of said slot except when there is an abnormal or unduly great relative lateral movement between the said truck frame structure and the car body structure and the said head or terminal being so arranged that its axis extends at right angles to lines tangent to the said curved slot.

6. In a safety attachment for railway cars, the combination of the air line pipe of an air brake system, an outlet from said pipe, a movable valve member for opening and closing the said outlet, said valve member having an arm projecting therefrom, a truck bolster, a bracket projecting from said bolster and having a curved slot therein concentric with the center of said bolster into which the said arm projects, the length of said slot being such that its opposite ends will not contact with the said arm except when there is abnormal relative movement between the said bracket and bolster and the said arm.

In testimony that I claim the foregoing as my invention I have hereunto signed my name this 26th day of June A. D., 1919.

JAMES D. KING.